United States Patent
Hoetzer et al.

(10) Patent No.: US 8,532,870 B2
(45) Date of Patent: Sep. 10, 2013

(54) DRIVER ASSISTANCE SYSTEM FOR MOTOR VEHICLE/TRAILER COMBINATIONS

(75) Inventors: Dieter Hoetzer, Farmington Hills, MI (US); Jean-Francois Pelosse, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 1105 days.

(21) Appl. No.: 12/265,009

(22) Filed: Nov. 5, 2008

(65) Prior Publication Data
US 2009/0125182 A1  May 14, 2009

(30) Foreign Application Priority Data
Nov. 6, 2007  (DE) .................. 10 2007 052 759

(51) Int. Cl.
G06F 7/00 (2006.01)
B62B 1/00 (2006.01)
B60T 7/20 (2006.01)

(52) U.S. Cl.
USPC .............................. 701/36; 280/656; 303/123

(58) Field of Classification Search
USPC ..... 701/36, 41, 42, 60, 68, 71, 72, 30.1–31.2, 701/498, 300; 340/856.3, 995.28, 426.24, 340/568.2, 943, 855.6; 280/839, 837–838, 280/406.2, 407.1, 418.1, 423.1, 430, 462, 280/789, 93.502, DIG. 14; 303/123, 146, 303/140, 138; 244/1 TD
See application file for complete search history.

(56) References Cited

U.S. PATENT DOCUMENTS

| | | | |
|---|---|---|---|
| 5,409,301 A | 4/1995 | Töpfer et al. | |
| 6,446,998 B1 * | 9/2002 | Koenig et al. | 280/432 |
| 7,826,953 B2 * | 11/2010 | Traechtler | 701/70 |
| 2007/0021906 A1 * | 1/2007 | Yeh et al. | 701/207 |

FOREIGN PATENT DOCUMENTS

| | | |
|---|---|---|
| DE | 4136571 | 3/1993 |
| DE | 199 01 953 | 7/2000 |
| DE | 10031266 | 1/2001 |
| WO | WO 2006005652 | 1/2006 |

\* cited by examiner

*Primary Examiner* — Muhammad Shafi
(74) *Attorney, Agent, or Firm* — Kenyon & Kenyon LLP

(57) ABSTRACT

A driver assistance system for motor vehicle/trailer combinations having a towing vehicle and at least one trailer, having a sensor unit for detecting the dynamics of the trailer, an electronic analysis unit for analyzing the data of the sensor unit, and an output unit for outputting an instability signal, which indicates a dynamic instability of the trailer established by the analysis unit, and having at least one assistance function which automatically triggers and controls a braking operation under specific conditions, the assistance function being designed to limit the absolute value of the deceleration of the vehicle during the braking operation to a value as a function of the instability signal.

11 Claims, 2 Drawing Sheets

DRIVER ASSISTANCE SYSTEM FOR MOTOR VEHICLE/TRAILER COMBINATIONS

FIELD OF THE INVENTION

The present invention relates to a driver assistance system for motor vehicle/trailer combinations having a towing vehicle and at least one trailer, having a sensor unit for detecting the dynamics of the trailer, an electronic analysis unit for analyzing the data of the sensor unit, and an output unit for outputting an instability signal, which indicates a dynamic instability of the trailer established by the analysis unit, and having at least one assistance function, which triggers and controls a braking operation automatically under specific conditions.

BACKGROUND INFORMATION

In motor vehicle/trailer combinations, depending on the travel velocity, crosswind conditions, tires, and load, the trailer has a more or less pronounced tendency to dynamic instability which is referred to as "trailer swings" and expresses itself in that the trailer swings to the right and left around the extension of the central axis of the towing vehicle.

A driver assistance system is described in German Patent Application No. DE 199 01 953, in which the instability of the trailer is measured continuously and, if it exceeds a permissible value, a braking operation is triggered automatically to bring the combination below a critical velocity, at which the swinging oscillations die out again.

The sensor unit for detecting the instability is formed by two ultrasonic sensors which are installed in different transverse positions in the rear of the towing vehicle and measure the distance to the trailer. By comparing the distance signals obtained by the various ultrasonic sensors, the current diagonal position of the front of the trailer in relation to the towing vehicle may be detected, so that oscillations of the trailer may be identified.

Electronic driver assistance systems are also known for motor vehicles, via which it is possible, for example, to measure the distance to a preceding vehicle with the aid of a radar sensor and to regulate the velocity of the host vehicle on this basis in such a manner that the preceding vehicle is followed at an appropriately safe distance (ACC; adaptive cruise control). Other driver assistance systems are used to recognize an imminent collision with another vehicle and then automatically trigger emergency braking so that the collision may be avoided or at least its consequences may be reduced. These types of driver assistance systems also have an assistance function, which automatically triggers and controls a braking operation under specific conditions.

SUMMARY OF THE INVENTION

An object of the present invention is to provide a driver assistance system for motor vehicle/trailer combinations, via which increased safety is achieved in the event of automatically triggered braking operations.

This object is achieved according to the present invention in that the assistance function is implemented for the purpose of limiting the absolute value of the deceleration of the vehicle during the braking operation to a value as a function of the instability signal.

If a braking intervention having high braking deceleration, such as emergency braking, is automatically triggered at an instant at which the trailer is already in an unstable state, the instability may thus be amplified still further until the trailer finally breaks away. The resulting damage may be greater than the damage which is to be prevented by the emergency braking.

According to the present invention, the signal which indicates the instability of the trailer is used for the purpose of limiting the deceleration, i.e., the negative absolute acceleration, during the automatically triggered braking operation, to a value at which the careening movements of the trailer do not build up further and do not result in the trailer breaking away.

In some countries, the trailers of tractor/trailer combinations are generally equipped with ESP systems, which are also capable, independently of the driver assistance system suggested here, of stabilizing the dynamics of the trailer in the event of high braking decelerations, for example, in the event of emergency braking at an acceleration of $-5$ m/s$^2$ or less. In these cases, the system according to the present invention would function in the event of malfunctions of the ESP system.

In other countries, however, stability systems for trailers are not as developed or are not present at all, so that it has been necessary there until now to limit the deceleration of the towing vehicle to a specific minimum value for the acceleration, for example, to $-2$ m/s$^2$. Even then, in the event of poor road grip, for example, on a rain-slicked or ice-slicked roadway, the trailer may still break away, possibly even from accelerations below 0.5 m/s$^2$.

The present invention offers the important advantage that breaking away of the trailer may be prevented without a limiting value for the deceleration having to be permanently predefined, and independently of the existence or nonexistence and/or the performance capability of an electronic stability system or ABS system for the trailer. When configuring driver assistance systems for trucks, it is no longer necessary to differentiate between the intended areas of use of the trucks, because the driver assistance system according to the present invention influences the braking deceleration in each case in such a manner that the greatest possible braking deceleration is available in the event of automatically triggered braking operations, in which the trailer still does not break away.

The sensor unit for detecting the dynamics of the trailer may also include other distance sensors as well as various other sensor types alternatively or additionally to the cited ultrasonic sensors, such as longitudinal and transverse acceleration sensors, yaw rate sensors, and the like, which are installed in the trailer and are electrically connected to the analysis unit in the towing vehicle.

A variable is preferably derived from the data of the sensor unit which specifies the extent of the careening of the trailer, and this variable is compared to one or more fixed or variable threshold values, and if a threshold value is exceeded, the allowed braking deceleration for autonomous braking operations is limited accordingly. The threshold values may be a function of the dynamic data of the towing vehicle, such as its velocity, the detected coefficient of friction of the roadway, and the like.

The system according to the present invention may also be continuously active during travel, to provide the driver with feedback about the careening tendency of the trailer. However, dynamic data of the towing vehicle which indicate cornering in particular is also to be taken into consideration because a diagonal position of the trailer in relation to the towing vehicle naturally occurs in the event of cornering, without this indicating careening of the trailer.

DETAILED DESCRIPTION

Figure 1:
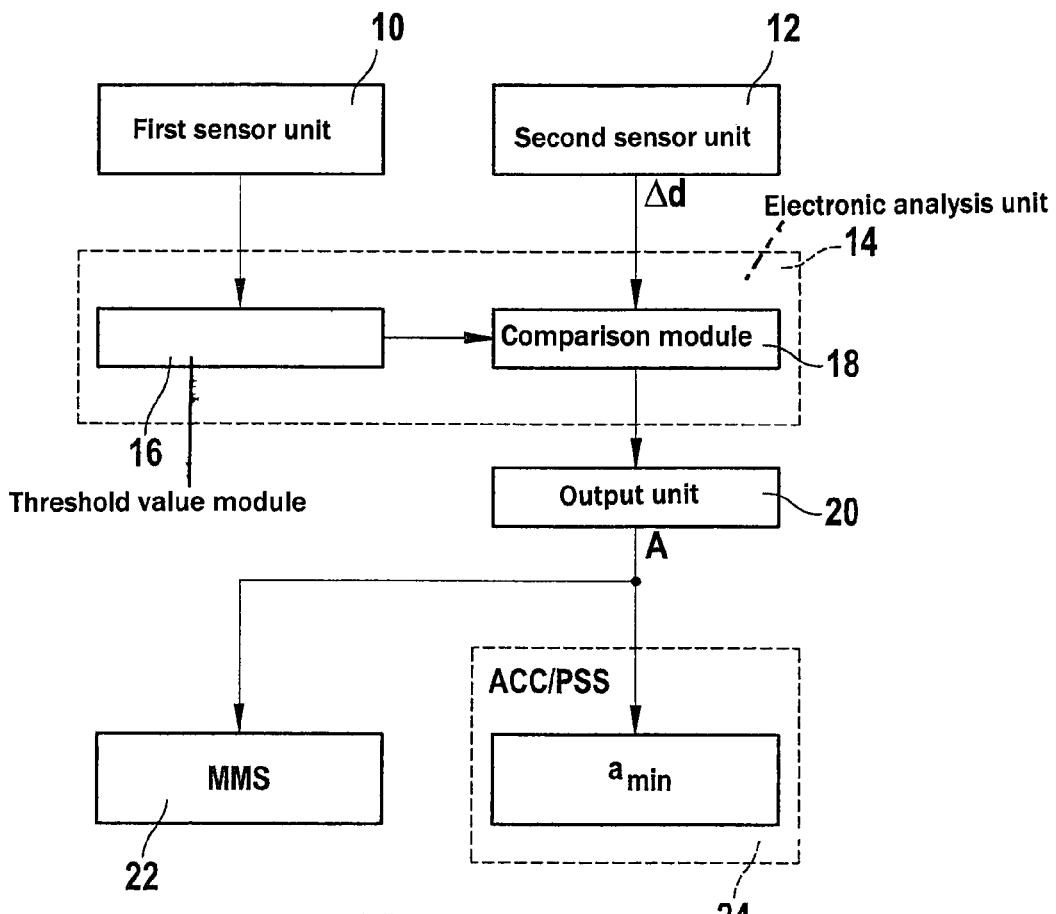
FIG. 1 shows a block diagram of a driver assistance system according to the present invention.

The driver assistance system shown as a block diagram in FIG. 1 is particularly provided for motor vehicle/trailer combinations having a towing vehicle and at least one trailer. It includes a first sensor unit 10 for detecting the dynamic data of the towing vehicle. This sensor unit corresponds to the sensor system of typical driver assistance systems, which are used in single vehicles for distance regulation or for triggering emergency brakes, and detects, for example, the velocity, the yaw rate, the turning angle of the steering wheel, and the like of the towing vehicle. Independently thereof, in the system according to the present invention, a second sensor unit 12 is used for detecting dynamic data of the trailer, in particular dynamic data which indicate a careening movement and a tendency of the trailer to break away. In the example shown, these data are represented by a variable $\Delta d$, whose significance is explained in greater detail below.

An electronic analysis unit 14, which is formed, for example, by a special microcomputer or special software for a data processing system, which also assumes other assistance functions, includes a threshold value module 16 and a comparison module 18. Variable $\Delta d$ provided by second sensor unit 12 is compared in comparison module 18 to threshold values which are calculated by threshold value module 16 as a function of the dynamic data of the towing vehicle, in particular as a function of its velocity. If $\Delta d$ (in absolute value) is greater than the threshold value, comparison module 18 prompts an output unit 20 to output a signal A which indicates the danger of the trailer breaking away. This signal A may be communicated to the driver, for example, via a display or a loudspeaker of a human/machine interface 22, so that the driver may stabilize the trailer again.

The driver assistance system described here has assistance functions 24 which allow automatic distance regulation (ACC; adaptive cruise control) or automatic triggering of emergency brakes (PSS; predictive safety system). This ACC-PSS system is thus capable of intervening in the brake system of the towing vehicle (and possibly also that of the trailer). The (negative) setpoint acceleration which may occur during an autonomous, i.e., automatically triggered, braking operation is limited to a value $a_{min}$. The output of signal A by output unit 20 causes an increase of (negative) value $a_{min}$ in assistance functions 24, so that the trailer may be prevented from breaking away in consideration of the instability of the trailer by the limiting of the vehicle deceleration.

Figure 2:
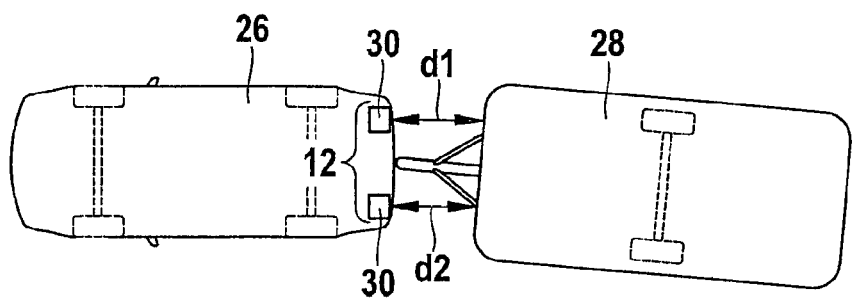
FIG. 2 shows a schematic sketch of a motor vehicle/trailer combination having a driver assistance system according to the present invention.

The outlines of a towing vehicle 26 and a trailer 28 of a motor vehicle/trailer combination are schematically shown in FIG. 2. Second sensor unit 12 is formed here by two ultrasonic sensors 30, which are installed on the left and right sides on the rear of towing vehicle 26 and are directed to the rear. These ultrasonic sensors 30 may, for example, be ultrasonic sensors which are part of a parking or routing aid for towing vehicle 26 which is already present, so that practically no additional costs arise for the system according to the present invention. Ultrasonic sensors 30 measure distance d1 and d2, respectively, to the front of trailer 28. If the trailer is not oriented exactly parallel to the towing vehicle, as is the case during swinging of the trailer (trailer swing), for example, distances d1 and d2 measured by both ultrasonic sensors 30 differ. Variable $\Delta d=d1-d2$ is thus a measure of the "swinging amplitude" of trailer 28.

Figure 3:
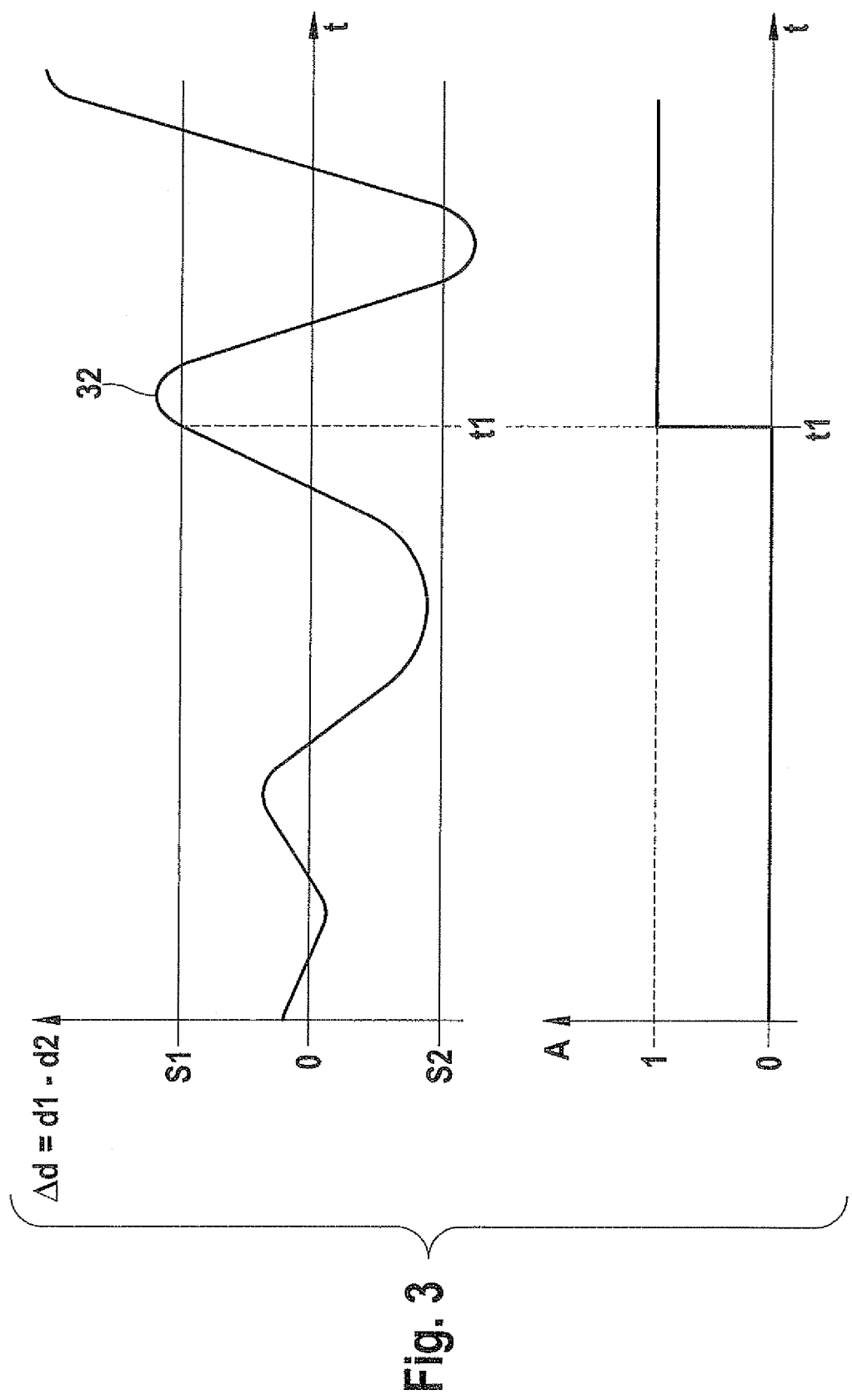
FIG. 3 shows a diagram to explain the mode of operation of the driver assistance system.

In FIG. 3, curve 32 indicates the changes of variable $\Delta d$ as a function of time t for a typical situation, in which the careening movements of trailer 28 build up during travel. In addition, an upper threshold value S1 and a lower threshold value S2 are shown as horizontal lines, which are calculated by threshold value module 16. When driving straight ahead, threshold values S1 and S2 will correspond in absolute value, and they will only be a function of the velocity of towing vehicle 26. If necessary, they may also be a function of the coefficient of friction of the roadway if this may be established with the aid of an ESP system of towing vehicle 26.

In the example shown, curve 32 initially remains within the range delimited by threshold values S1 and S2; however, the oscillations of the trailer gradually build up until curve 32 finally exceeds upper threshold value S1 at time t1. At this time t1, signal A is output to driver assistance system 24 (and possibly to human/machine interface 22) by output unit 20. In driver assistance system 24, limiting value $a_{min}$ for the permissible vehicle deceleration is then raised to $-2$ m/s$^2$, for example. Signal A may drop back to logical "0" after a certain hysteresis time or remain at logical "1" until the ignition is turned off, depending on the embodiment.

If a braking operation is triggered autonomously by one of assistance functions 24 at any time after time t1, i.e., in a phase of higher instability of the trailer, the limiting of the deceleration to $a_{min}$ will ensure that the trailer does not break away.

At a higher travel velocity, threshold values S1 and S2 will be smaller in absolute value, so that signal A is correspondingly output earlier. Of course, it is also possible to provide multiple threshold values or pairs of threshold values which result in sequence in a step-by-step increase of limiting value $a_{min}$.

In a modified embodiment (not shown), analysis unit 14 may also detect the curvature of the current driving course of the motor vehicle/trailer combination on the basis of the data of first sensor unit 10 and calculate the value of $\Delta d$ therefrom which corresponds to this curvature. Variable $\Delta d$ measured using second sensor unit 12 may then be corrected by this value caused by the cornering. In this case, the corrected "swinging amplitude" may also be continuously displayed to the driver or it may be recorded, so that the driver receives feedback about the stability behavior of trailer 28 and may initiate servicing of the brake system of the trailer or the like if needed in the event of inadequate stability behavior.

In the example shown, the driver assistance system was described for the case of a motor vehicle/trailer combination having only one trailer. However, the system may also be used similarly in motor vehicle/trailer combinations having two or more trailers, in each case the last trailer of the combination taking the place of trailer 28 in FIG. 1, while sensor unit 12 is attached to at least the next-to-last trailer.

What is claimed is:

1. A driver assistance system for a motor vehicle/trailer combination having a towing vehicle and at least one trailer, comprising:
   a first sensor unit for detecting dynamics of the motor vehicle including a velocity, a yaw rate, and a turning angle of the motor vehicle;
   a second sensor unit for detecting dynamics of the trailer including at least two measured distances between the motor vehicle and the trailer, a first distance measured from a passenger side ultrasonic sensor and a second distance measured from a driver side ultrasonic sensor;

an electronic analysis unit for analyzing data of the second sensor unit and determining a swinging amplitude from a difference between the first measured distance and the second measured distance;

and an output unit for outputting an instability signal, which indicates a dynamic instability of the trailer when the swinging amplitude is greater than an upper threshold or less than a lower threshold, and having at least one assistance function which determines a limiting value $a_{min}$ for a permissible vehicle deceleration during a braking operation while the outputted instability signal indicates the trailer is instable;

wherein the analysis unit is configured to calculate a curvature of a course traveled by the motor vehicle/trailer combination on the basis of the detected dynamics at the first sensor unit and to correct a difference of the distances measured by the passenger side ultrasonic sensor and the driver side ultrasonic sensor by a component which is caused by the course curvature, and to output the corrected difference as a variable which is representative of a tendency of the trailer to break away.

2. The driver assistance system according to claim 1, wherein the second sensor unit is set up to determine a variable which is representative of a tendency of the trailer to break away, and the analysis unit has a comparison module for comparing the variable to at least one threshold value and for activating the output unit as a function of a comparison result.

3. The driver assistance system according to claim 2, wherein the analysis unit is configured to vary the threshold value as a function of the detected dynamics at the first sensor unit.

4. The driver assistance system according to claim 1, further comprising:
   a human/machine interface for outputting the signal generated by the output unit to a driver.

5. The driver assistance system according to claim 1, further comprising:
   a human/machine interface for outputting the signal generated by the output unit to a driver;
   wherein the second sensor unit is set up to determine a variable which is representative of a tendency of the trailer to break away, and the analysis unit has a comparison module for comparing the variable to at least one threshold value and for activating the output unit as a function of a comparison result.

6. The driver assistance system according to claim 5, wherein the assistance function compares the instability signal to a plurality of sequential threshold values and increases the calculated limiting value $a_{min}$ for each threshold value that is exceeded.

7. The driver assistance system according to claim 1, wherein when the motor vehicle is traveling in a straight direction, the upper threshold and the lower threshold are determined only as a function of a velocity of the motor vehicle, and wherein when the motor vehicle is traveling in a curved direction, a curvature of the motor vehicle is determined from the detected dynamics at the first sensor unit and the swinging amplitude is corrected based on the determined curvature.

8. A driver assistance system for a motor vehicle/trailer combination having a towing vehicle and at least one trailer, comprising:
   a first sensor unit for detecting dynamics of the motor vehicle including a velocity, a yaw rate, and a turning angle of the motor vehicle;
   a second sensor unit for detecting dynamics of the trailer including at least two measured distances between the motor vehicle and the trailer, a first distance measured from a passenger side ultrasonic sensor and a second distance measured from a driver side ultrasonic sensor;
   an electronic analysis unit for analyzing data of the second sensor unit and determining a swinging amplitude from a difference between the first measured distance and the second measured distance;
   and an output unit for outputting an instability signal, which indicates a dynamic instability of the trailer when the swinging amplitude is greater than an upper threshold or less than a lower threshold, and having at least one assistance function which determines a limiting value $a_{min}$ for a permissible vehicle deceleration during a braking operation while the outputted instability signal indicates the trailer is instable;
   wherein the assistance function compares the instability signal to a plurality of sequential threshold values and increases the calculated limiting value $a_{min}$ for each threshold value that is exceeded.

9. The driver assistance system according to claim 8, wherein the analysis unit is configured to vary at least one threshold value as a function of dynamic variables of the towing vehicle.

10. The driver assistance system according to claim 9, wherein the analysis unit is configured to determine a curvature of a course traveled by the motor vehicle/trailer combination on the basis of the detected dynamics at the first sensor unit to correct a difference of the distances measured by the passenger side ultrasonic sensor and the driver side ultrasonic sensor by a component which is caused by the course curvature, and to output the corrected difference as a variable which is representative of a tendency of the trailer to break away.

11. The driver assistance system according to claim 8, wherein the analysis unit is configured to determine a curvature of a course traveled by the motor vehicle/trailer combination on the basis of the detected dynamics at the first sensor unit to correct a difference of the distances measured by the passenger side ultrasonic sensor and the driver side ultrasonic sensor by a component which is caused by the course curvature, and to output the corrected difference as a variable which is representative of a tendency of the trailer to break away.

* * * * *